(12) United States Patent
Zhou et al.

(10) Patent No.: US 12,523,369 B2
(45) Date of Patent: Jan. 13, 2026

(54) CEILING ASSEMBLY AND FAN LAMP

(71) Applicants: SUZHOU OPPLE LIGHTING CO., LTD., Suzhou (CN); OPPLE LIGHTING CO., LTD., Shanghai (CN)

(72) Inventors: Dingde Zhou, Suzhou (CN); Guobao Zhang, Suzhou (CN); Xiaolei Wang, Suzhou (CN)

(73) Assignees: Suzhou Opple Lighting Co., Ltd., Suzhou (CN); Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 18/645,347

(22) Filed: Apr. 24, 2024

(65) Prior Publication Data

US 2024/0344677 A1 Oct. 17, 2024

Related U.S. Application Data

(63) Continuation of application No. PCT/CN2022/126641, filed on Oct. 21, 2022.

(30) Foreign Application Priority Data

Oct. 25, 2021 (CN) .......................... 202111240826.1
Oct. 25, 2021 (CN) .......................... 202122567464.9

(51) Int. Cl.
*F16M 11/00* (2006.01)
*F04D 25/08* (2006.01)
(Continued)

(52) U.S. Cl.
CPC ........ *F21V 33/0096* (2013.01); *F04D 25/088* (2013.01); *F04D 29/601* (2013.01);
(Continued)

(58) Field of Classification Search
CPC ...... F21V 33/0096; F21V 21/03; F21V 21/34; F04D 25/088; F04D 29/601; F21S 8/043; F05D 2260/33
See application file for complete search history.

(56) References Cited

U.S. PATENT DOCUMENTS 11,073,166 B2 * 7/2021 Gorali .................. F04D 29/601
12,044,356 B2 * 7/2024 Zhang .................. F04D 25/088
(Continued)

FOREIGN PATENT DOCUMENTS

CN 207179441 U 4/2018
CN 211925554 U 11/2020
(Continued)

OTHER PUBLICATIONS

International Search Report of PCT/CN2022/126641 dated Jan. 20, 2023 with English translation.

*Primary Examiner* — Amy J. Sterling
(74) *Attorney, Agent, or Firm* — Arch & Lake LLP

(57) ABSTRACT

The present disclosure provides a ceiling assembly and a fan lamp, the ceiling assembly is configured for an installation of a fan lamp, and including: a bracket body and a ceiling box, wherein the ceiling box has an installation cavity, and the bracket body is housed in the installation cavity, the ceiling box is provided with a first connecting part, the bracket body is provided with a second connecting part at a position corresponding to the first connecting part, the first connecting part is detachably connected with the second connecting part, and the first connecting part is provided with a first guiding part on a connecting surface thereof corresponding to the second connecting part.

9 Claims, 7 Drawing Sheets

(51) Int. Cl.
  *F04D 29/60* (2006.01)
  *F21S 8/04* (2006.01)
  *F21V 21/03* (2006.01)
  *F21V 21/34* (2006.01)
  *F21V 33/00* (2006.01)

(52) U.S. Cl.
  CPC .............. *F21S 8/043* (2013.01); *F21V 21/03* (2013.01); *F21V 21/34* (2013.01)

(56) References Cited

U.S. PATENT DOCUMENTS

2010/0329885 A1* 12/2010 Criner ................... F04D 29/601
  248/343
2011/0031368 A1* 2/2011 Wang ...................... F24F 7/007
  248/342

FOREIGN PATENT DOCUMENTS

| CN | 113757150 A | 12/2021 |
| CN | 216342927 U | 4/2022 |
| GB | 2484698 A | 4/2012 |
| WO | 2019180692 A1 | 9/2019 |

\* cited by examiner

CEILING ASSEMBLY AND FAN LAMP

CROSS-REFERENCE TO RELATED APPLICATIONS

This application is based upon and claims the priority of PCT patent application No. PCT/CN2022/126641 filed on Oct. 21, 2022 which claims priority to the Chinese patent application No. 202111240826.1, filed on Oct. 25, 2021 and of Chinese patent application No. 202122567464.9, filed on Oct. 25, 2021, the entire contents of which are hereby incorporated by reference herein for all purposes.

TECHNICAL FIELD

The present disclosure relates to the technical field of lighting device, and in particular to a ceiling assembly and a fan lamp.

BACKGROUND

Fan lamp is a commonly used household appliance, and is a combination of a lighting lamp and a fan, the fan lamp not only has a lighting performance of the lighting lamp, but also has a thermal dissipation performance of the fan, and has become a most common lamp for indoor lighting, and widely applied in various scenarios such as in a house, an office, a public place of entertainment, or the like.

SUMMARY

The present disclosure provides a ceiling assembly for fan lamp installation and a fan lamp.

According to a first aspect, the present disclosure provides a ceiling assembly, configured for an installation of a fan lamp. The ceiling assembly may include a bracket body and a ceiling box, where the ceiling box may have an installation cavity, and the bracket body may be housed in the installation cavity, the ceiling box may be provided with a first connecting part, the bracket body may be provided with a second connecting part at a position corresponding to the first connecting part, the first connecting part is detachably connected with the second connecting part, and the first connecting part may be provided with a first guiding part on a connecting surface thereof corresponding to the second connecting part.

According to another aspect, a fan lamp is provided. The fan lamp may include a suspension assembly, a blade assembly, a light source assembly, and a ceiling assembly as described above, the ceiling assembly may be detachably connected to the suspension assembly, the suspension assembly may be fixedly connected to the blade assembly and the light source assembly, and the light source assembly is disposed on a side of the blade assembly away from the ceiling assembly.

It is to be understood that both the foregoing general description and the following detailed description are exemplary and explanatory only and are not restrictive of the present disclosure.

BRIEF DESCRIPTION OF DRAWINGS

The following detailed description of examples of the present disclosure, in conjunction with accompanying drawings, will make technical solutions and other beneficial effects of the present disclosure apparent.

DETAILED DESCRIPTION

In order to make objects, technical solutions and advantages of the present disclosure clearer, the present disclosure is described in detail below in connection with the accompanying drawings and examples.

Herein, it is to be noted that, in order to avoid obscuring the present disclosure due to unnecessary details, only structures and/or processing steps closely related to the examples of the present disclosure are shown in the accompanying drawings, and other details not closely related to the present disclosure are omitted.

In addition, it is also to be noted that the terms "include", "comprise", or any other variant thereof are intended to cover non-exclusive inclusion, such that a process, method, article or apparatus including a set of elements includes not only those elements, but also other elements that are not explicitly listed, or also include elements that are inherent to such process, method, article, or apparatus.

In a fan lamp, sometimes, ceiling box of the fan lamp is fixed with screws, and need multiple people to cooperate, in which one person lift the fan lamp and make the installation hole of ceiling box be aligned with a screw hole of a bracket body, and another person fastens the fan lamp through the screw, the installation process is difficult, and an appearance of the fan lamp is not aesthetically pleasing, which affects the overall aesthetics of the fan lamp. In addition, the installation process of the fan lamp often need climbing work, using screws for fixing make the installation and disassembly of the fan lamp difficult, and an labor intensity of an installer is high, which is easy to endanger a personal safety of the installer, and is time-consuming and laborious.

In view of above, a ceiling assembly and a fan lamp are provided.

Referring to FIG. 1 to FIG. 9, in which a ceiling assembly 1 for installation of a fan lamp 100 provided by the present disclosure is illustrated. The ceiling assembly 1 includes a bracket body 12 and a ceiling box 11, the bracket body 12 and the ceiling box 11 are detachably connected, and the ceiling box 11 is installed on an installation base through the bracket body 12. The installation base is used for hanging the fan lamp 100, for example, the installation base may be a ceiling of a house or the like. By setting the detachable connection between the bracket body 12 and the ceiling box 11 to replace a threadedly fixed connection between the bracket body 12 and the ceiling box 11 in the prior art, the installation process is simplified, the installation cost is reduced, and processes for installing and disassembling the fan lamp 100 having the ceiling assembly 1 is convenient and quick, and the installation and disassembly can be realized by a single person, which is time-saving and labor-saving, and highly efficient and safe.

Figure 1:
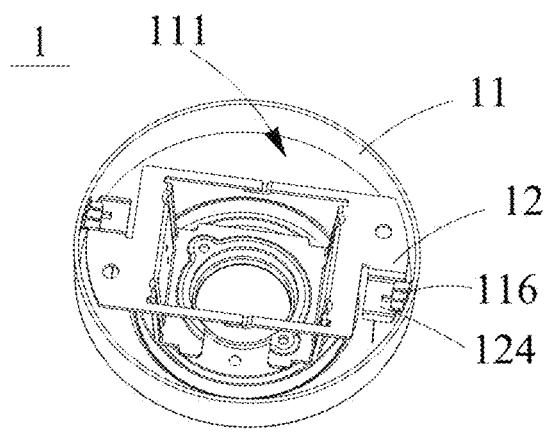
FIG. 1 is a perspective view of an example of the ceiling assembly of the present disclosure.
Figure 2:
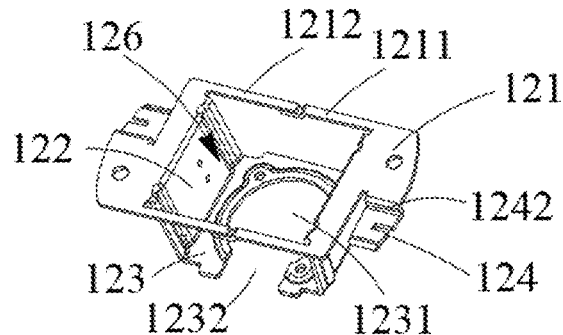
FIG. 2 is a structural exploded view of FIG. 1.
Figure 2:
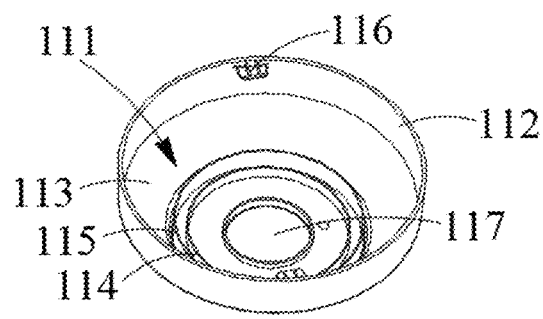
Figure 3:
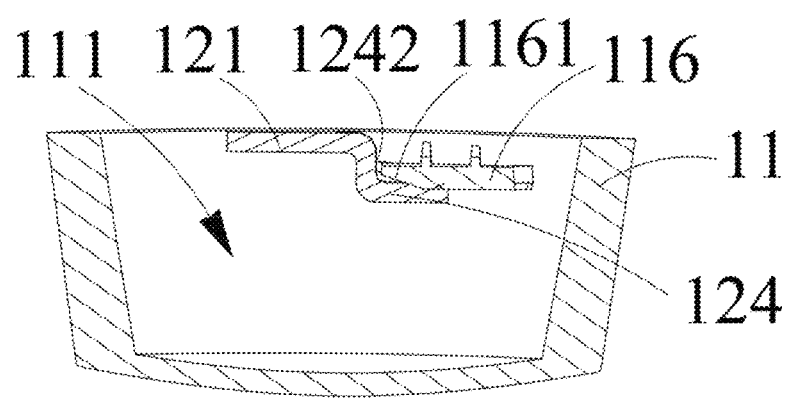
FIG. 3 is a cross-sectional view of FIG. 1.
Figure 4:
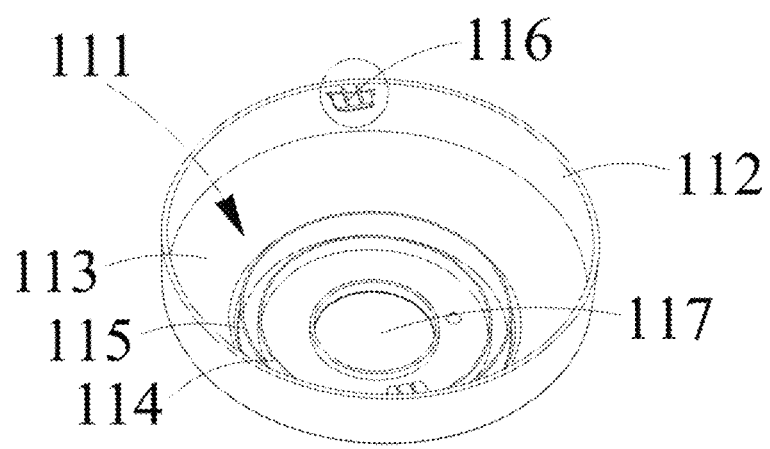
FIG. 4 is a perspective view of a ceiling box in FIG. 1.
Figure 5:
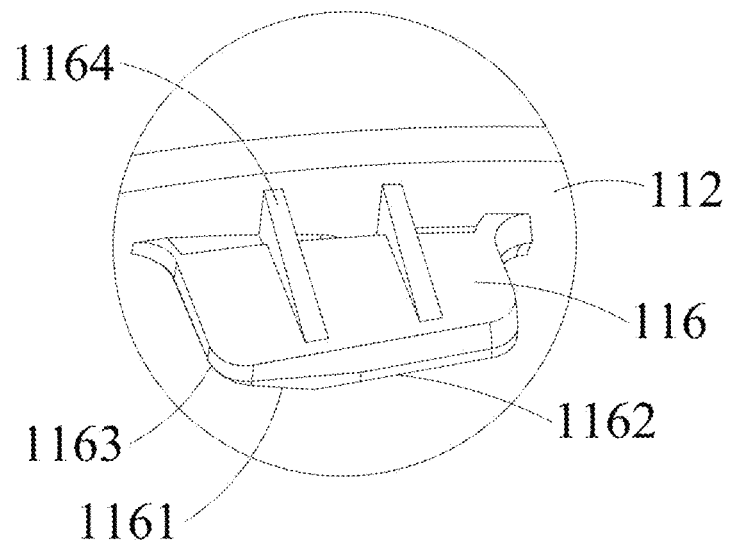
FIG. 5 is a partial structural enlarged view of FIG. 4.
Figure 6:
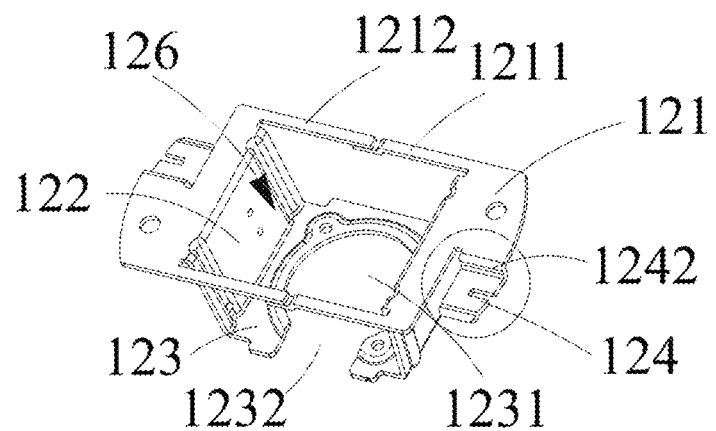
FIG. 6 is a perspective view of a bracket body in FIG. 1.

Referring to FIG. 4 to FIG. 6, and in conjunction with FIG. 1 to FIG. 3, as illustrated in these figures, the ceiling box 11 has an installation cavity 111, and the bracket body 12 is housed in the installation cavity 111, so as to reduce a space occupied by the bracket body 12 and to improve the structural compactness of the fan lamp 100. Further, the installation cavity 111 of the ceiling box 11 may also accommodate some functional components of the fan lamp 100, such as a drive assembly, a power supply assembly, a safety rope assembly 5, a terminal assembly 6, and the like, so as to better utilize the space of the ceiling box 11 and to improve a structural compactness and aesthetic appearance of the fan lamp 100.

Specifically, the ceiling box 11 includes a first annular part 112 and a truncated conical part 113 disposed below the first annular part 112, and the first annular part 112 and the truncated conical part 113 enclose to form the installation cavity 111. The truncated conical part 113 includes a first end and a second end, the first end and the second end are parallel to each other, and a cross-sectional area of the first end in a horizontal direction is larger than a cross-sectional area of the second end in the horizontal direction. A plane at which a top of the first annular part 112 is located is higher than or coplanar with a plane at which the installation part 121 of the bracket body 12 is located, so that the bracket body 12 is completely accommodated inside the ceiling box 11, and the structural compactness and aesthetics of appearance of the fan lamp 100 are improved. A bottom of the first annular part 112 is connected to the first end, so as to increase a volume of the installation cavity 111 of the ceiling box 11. A side of the second end toward the first end extends toward a position close to the first end to form a second annular part 114 and a third annular part 115 that have a same center of circle, a diameter of the second annular part 114 is smaller than a diameter of the third annular part 115, and a height of the second annular part 114 in a vertical direction is lower than a height of the third annular part 115 in the vertical direction. The bracket body 12 is housed within the installation cavity 111, and a base plate 123 of the bracket body 12 is located over the second annular part 114, and a sidewall 122 of the bracket body 12 abuts an inner wall of the third annular part 115, so as to limit and fix the bracket body 12 in the installation cavity 111 of the ceiling box 11, thereby limiting a degree of freedom of the bracket body 12 in the horizontal direction, and improving the connection stability of the ceiling assembly 1.

A first connecting part 116 is provided on an inner wall of the first annular part 112 of the ceiling box 11, a second connecting part 124 is provided on the bracket body 12 at a position corresponding to the first connecting part 116, the first connecting part 116 and the second connecting part 124 are detachably connected, and a first guiding part 1161 and a joint part 1162 are provided on a connecting surface of the first connecting part 116 corresponding to the second connecting part 124. The first guiding part 1161 is disposed to be inclined, preferably, the first guiding part 1161 is an inclined bevel, and an end of the first guiding part 1161 away from the joint part 1162 is a guiding end 1163, and a cross-sectional area, along the height direction, of the first guiding part 1161 at either one position is positively related to a spacing distance between the said either one position of the first guiding part 1161 and the guiding end 1163 of the first connecting part 116. By providing the first guiding part 1161, the second connecting part 124 is made to slide quickly along the first guiding part 1161 and onto a connecting surface located below the first connecting part 116, so that the first connecting part 116 and the second connecting part 124 are guided to be smoothly joined, which facilitates the detachable connection of the first connecting part 116 and the second connecting part 124. The joint part 1162 is connected to an end of the first connecting part 116 away from the guiding end 1163, and a width of the joint part 1162 in the horizontal direction is larger than a width of the first guiding part 1161 in the horizontal direction, so as to increase a tightness of the joint between the first connecting part 116 and the second connecting part 124. Preferably, the joint part 1162 is provided horizontally, of course, the joint part 1162 may also be provided with other structures that match the second connecting part 124, which is not limited in the present disclosure. By disposing the joint part 1162 to make the first connecting part 116 and the second connecting part 124 be tightly connected, a gravity of the ceiling box 11 itself is utilized to compact the first connecting part 116 and the second connecting part 124, so as to improve a stability of the connection between the ceiling box 11 and the bracket body 12.

Further, a reinforcing rib 1164 is disposed on a side of the first connecting part 116 away from the connecting surface, and the reinforcing rib 1164 is provided to play a role in positioning installation and providing a stable support for the first connecting part 116, so that the first connecting part 116 and the second connecting part 124 realize a positioning connection of the ceiling assembly 1, while increasing a structural strength of the first connecting part 116, and improving a connection firmness of the ceiling assembly 1.

Figure 7:
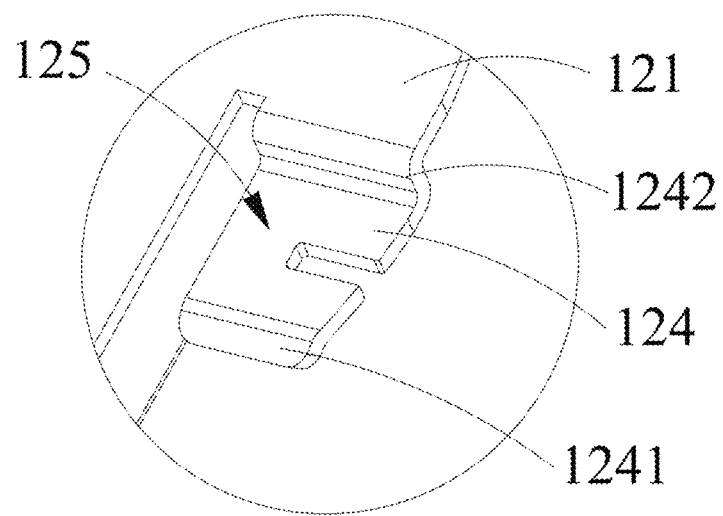
FIG. 7 is a partial structural enlarged view of FIG. 6.

Referring to FIG. 6 to FIG. 7, and in conjunction with FIG. 1 to FIG. 3, as illustrated therein, the bracket body 12 includes an installation part 121, a sidewall 122, and a bottom wall, the installation part 121 is connected to the installation base, the sidewall 122 is connected to the installation part 121 and the bottom wall, and the bottom wall is connected to the second annular part 114 of the ceiling box 11. In an example, the bracket body 12 may be an integrally-formed stamped structure, so that the structural strength of the bracket body 12 is enhanced, and connection fracture of the bracket body 12 can be avoided. The installation part 121 is provided with one or more first fixing hole, and a fastener such as a bolt passes through the first fixing hole and is fixedly connected to the installation base, and an accommodation space 126 is formed between the sidewall 122, an installation wall and the bottom wall of the bracket body 12, the accommodation space 126 is used to accommodate components such as a suspension assembly 2, a driving assembly of the fan lamp 100, or the like, so as to increase the structural compactness and aesthetics of the fan lamp 100.

The second connecting part 124 is provided below the installation part 121 of the bracket body 12, i.e., there exists a first height difference along the height direction between the installation part 121 and the second connecting part 124 to form a yielding space 125 on the bracket body 12, and facilitate a rotational snap connection of the first connecting part 116 on the ceiling box 11 and the second connecting part 124, meanwhile, the first connecting part 116 and the second connecting part 124 are both accommodated in the installation cavity 111 of the ceiling box 11 to fully utilize an internal space of the ceiling box 11 and improve the aesthetics of appearance of the fan lamp 100.

Further, the second connecting part 124 includes a second guiding part 1241 and a limiting part 1242, the limiting part 1242 and the second guiding part 1241 are located at two ends of the second connecting part 124, and an extension direction of the limiting part 1242 is opposite to an extension direction of the second guiding part 1241. In an example, the second guide part 1241 extends obliquely and downwardly to form a beveled guiding area, so as to guide the smooth joint between the first connecting part 116 and the second connecting part 124, and to reduce a fit accuracy requirement of the first connecting part 116 with the second connecting part 124. The limiting part 1242 extends upwardly and is fixedly connected with the installation part 121 and the second connecting part 124, so as to limit and stop the first connecting part 116, prevent the first connecting part 116 from sliding out of the second connecting part 124, thereby realizing the effect of anti-detachment, and improving the connection stability of the ceiling assembly 1.

In an example, an amount of the first connecting parts 116 is multiple, a plurality of first connecting parts 116 are uniformly arranged at a same circumference of an inner wall of the ceiling box 11. An amount of the second connecting parts 124 is multiple, and is the same as the amount of the first connecting parts 116, and a plurality of second connecting parts 124 are uniformly arranged at a same circumference of the bracket body 12. Preferably, two first connecting parts 116 are provided, and the two first connecting parts 116 are mirroring configured, and correspondingly, two second connecting parts 124 are also provided, and the two second connecting parts 124 are also mirroring configured. By mirroring configuration of the first connecting parts 116 and the second connecting parts 124, when the ceiling box 11 is rotated in a first direction, the two first connecting parts 116 and the two second connecting parts 124 realize a matching connection between the ceiling box 11 and the bracket body 12 through the guiding function of the first guiding part 1161 and the second guiding part 1241, so as to improve the stability of the connection of the ceiling assembly 1. When the ceiling box 11 is rotated in a second direction opposite to the first direction, the two first connecting parts 116 and the two second connecting parts 124 are both slid in a direction away from each other to realize the disassembly of the ceiling box 11 and the bracket body 12.

In another example, the installation part 121 of the bracket body 12 is provided with a first protruding part 1211 and a second protruding part 1212, the first protruding part 1211 and the second protruding part 1212 are provided to face each other, and the first protruding part 1211 and the second protruding part 1212 may be connected by sliding connection. Through the sliding connection of the first protruding part 1211 and the second protruding part 1212, the strength of the bracket body 12 can be improved while a volume of the bracket body 12 can be adjusted, thereby facilitating the installation of the bracket body 12.

Figure 8:
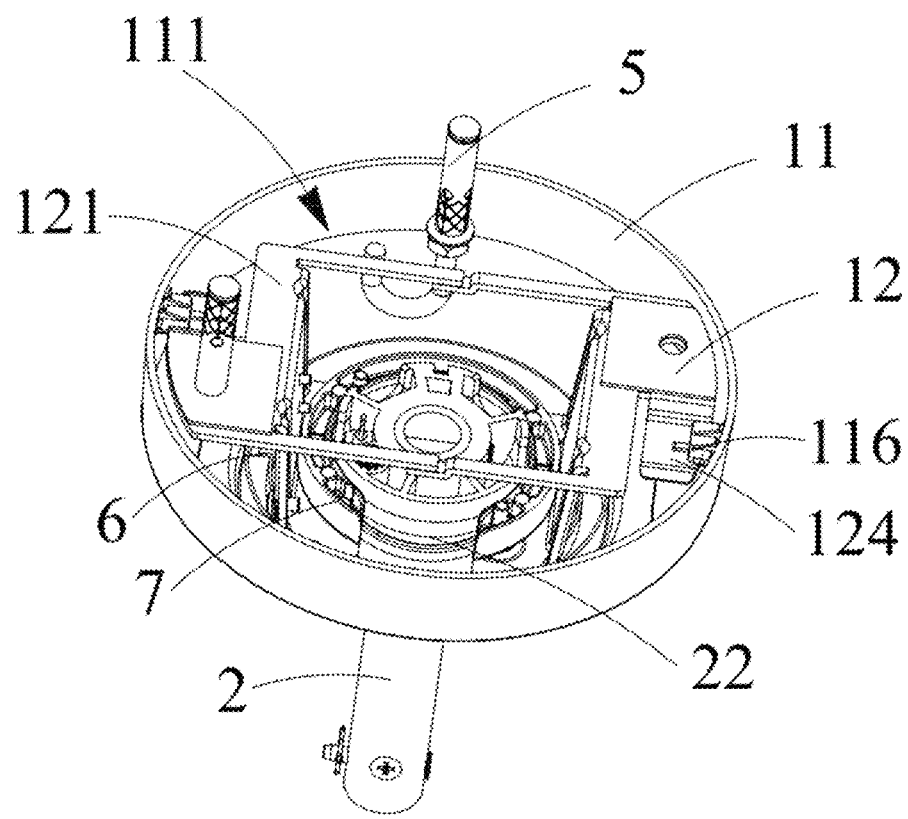
FIG. 8 is a perspective view of a suspension assembly installed on the ceiling assembly.
Figure 9:
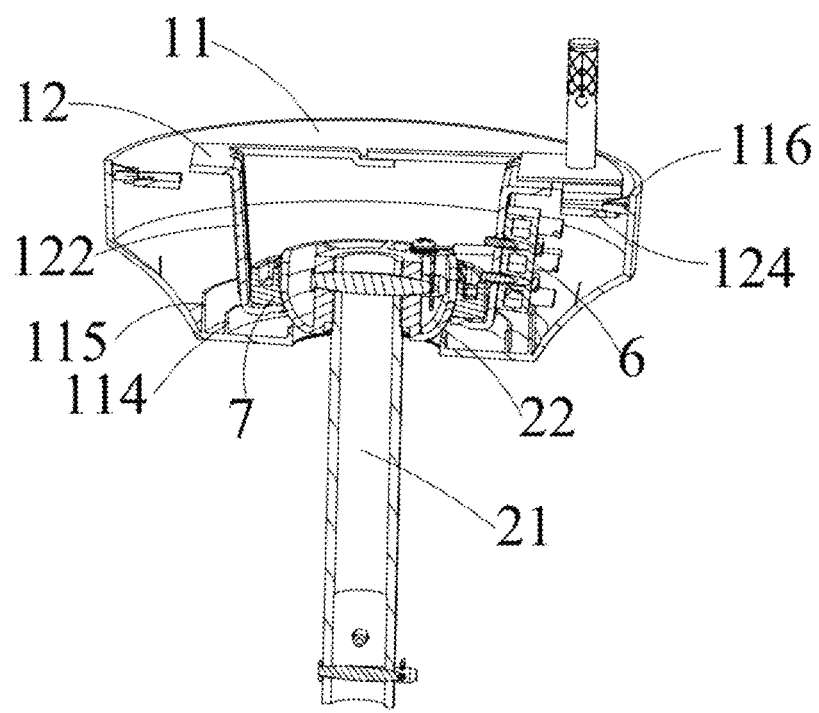
FIG. 9 is a cross-sectional view of FIG. 8.
Figure 10:
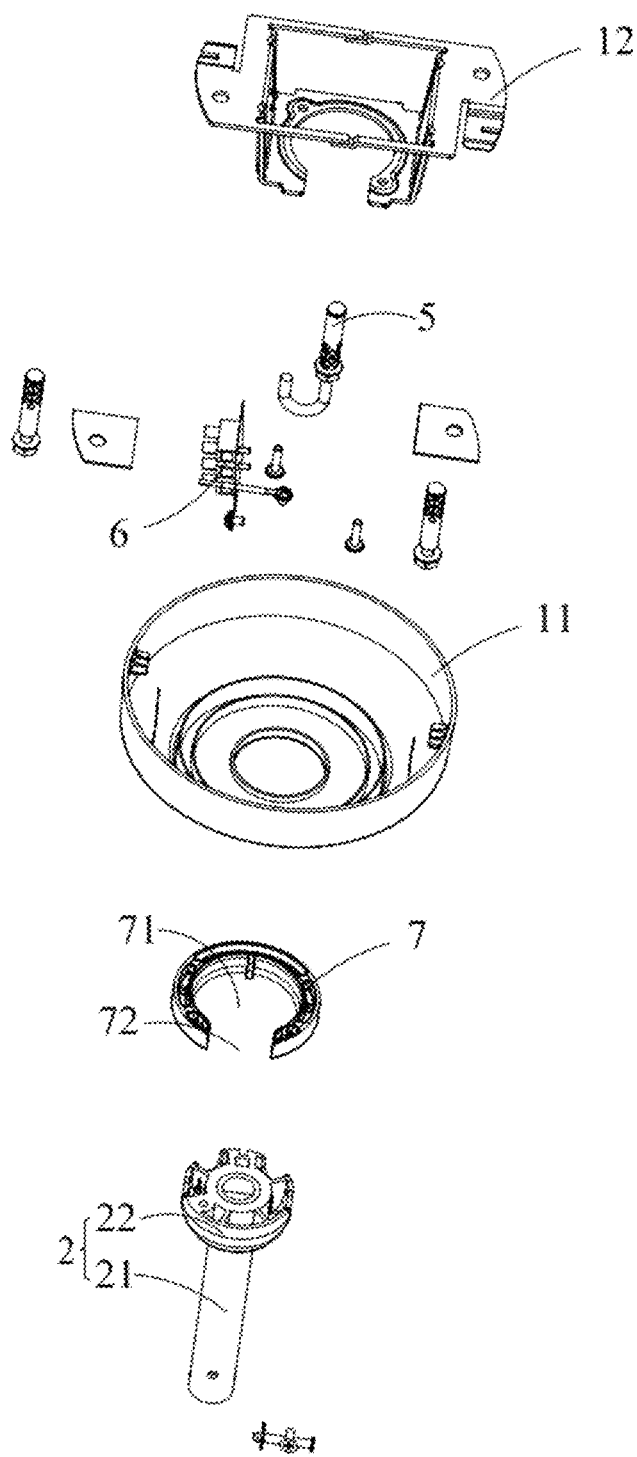
FIG. 10 is an exploded view of FIG. 8.

Referring to FIG. 8 to FIG. 10, the ceiling box 11 is provided with a first installation hole 117, the bracket body 12 is provided with a second installation hole 1231, the second installation hole 1231 is in spatial communication with the accommodation space 126, and the suspension assembly 2 passes through the first installation hole 117 and the second installation hole 1231 and is at least partially housed within the ceiling assembly 1 to realize the suspension installation of the fan lamp 100.

Specifically, the suspension assembly 2 includes a hanging rod 21 and a hanging ball 22, and the hanging rod 21 and the hanging ball 22 are detachably connected by threads, which is convenient for the installation and disassembly of the hanging rod 21 and the hanging ball 22, and convenient for the maintenance of the fan lamp 100. Further, in order to prevent the hanging rod 21 from detaching from the hanging ball 22, the hanging rod 21 and the hanging ball 22 may also be locked by fasteners such as screws in an example to achieve fixation between the hanging rod 21 and the hanging ball 22.

The hanging ball 22 passes through the first installation hole 117 and the second installation hole 1231, and is located in the accommodation space 126 and clamped in the second installation hole 1231, and the hanging rod 21 may be connected to a part of the hanging ball 22 that extends out of the accommodation space 126, and an end of the hanging rod 21 away from the hanging ball 22 may be connected to a blade assembly 3 and a light source assembly 4 to facilitate the suspension installation of the fan lamp 100.

Preferably, the base plate 123 is provided with a notch 1232, and the notch 1232 is connected with the second installation hole 1231, and the suspension assembly 2 is detachably connected with the bracket body 12 through the notch 1232. When the hanging rod 21 is disassembled from the bracket body 12, the hanging rod 21 is lifted, and moved out of the bracket body 12 from the notch 1232. When the hanging rod 21 is installed with the bracket body 12, the hanging rod 21 is lifted, and the hanging rod 21 is moved into the bracket body 12 from the notch 1232, then upon lowering the hanging rod 21, the hanging ball 22 is just secured in the second installation hole 1231. With such a configuration, the detachable connection between the suspension assembly 2 and the bracket body 12 is realized, which is convenient for the assembly and disassembly of the fan lamp 100.

In an example, a limit block 7 is further provided between the hanging ball 22 and the second installation hole 1231, and the limit block 7 is secured to the upper part of the second installation hole 1231 of the bracket body 12 by screw(s). A third installation hole 71 is provided in the limit block 7, and optionally, the limit block 7 is provided with an opening 72 at a position corresponding to the notch 1232 of the bracket body 12, and the opening 72 is connected to the third installation hole 71 to facilitate the detachably connection of the suspension assembly 2 and the bracket body 12. A cross-sectional dimension of the hanging rod 21 is smaller than that of the opening 72 of the limiting block 7 and that of the notch 1232 of the bracket body 12, and the cross-sectional dimension of the hanging ball 22 is larger than that of the opening 72 of the limiting block 7 and the notch 1232 of the bracket body 12. With such a configuration, the hanging rod 21 can enter into the interior of the limiting block 7 and the bracket body 12 from the opening 72 of the limiting block 7 and the notch 1232 of the bracket body 12, and make the hanging ball 22 be located above the limiting block 7. In this case, under an effect of gravity, the hanging ball 22 closely abuts an upper end surface of the limiting block 7 and subjected to a limiting effect of the limiting block 7, so that the hanging rod 21 and the fan assembly hanging installed through the hanging rod 21 are hanging installed on the bracket body 12.

In order to improve the stability of the support of the limiting block 7 to the hanging ball 22, the limiting block 7 in the example of the present disclosure has an inclined or a curved support surface, and accordingly, the outer side surface of the hanging ball 22 has an inclined or a curved surface. In this way, when the hanging ball 22 is limited by the limiting block 7, the outer side surface of the hanging ball 22 closely fits the support surface of the limiting block 7, thereby increasing a contact area between the hanging ball 22 and the limiting block 7, meanwhile, the acting force on the outer side surface of the hanging ball 22 applied by the support surface can be decomposed into an axial force and a radial force, the axial force can counteract an effect of gravity of the fan assembly, and the radial force can prevent the hanging ball 22 from moving and shifting with respect to the limiting block 7, so as to ensure the stability of the support for the hanging ball 22.

Figure 11:
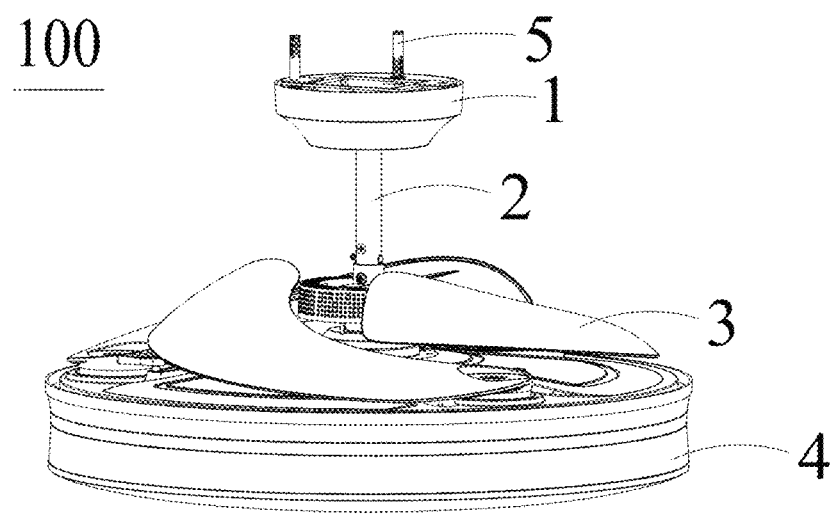
FIG. 11 is a perspective view of an example of the fan lamp of the present disclosure.

Referring to FIG. 11, the present disclosure provides an example of the fan lamp 100, which includes the suspension assembly 2, the blade assembly 3, the light source assembly 4, and the above-described ceiling assembly 1. The ceiling assembly 1 is detachably connected to the suspension assembly 2, the suspension assembly 2 is fixedly connected to the blade assembly 3 and the light source assembly 4, and the light source assembly 4 is disposed on a side of the blade assembly 3 away from the ceiling assembly 1. The ceiling assembly 1 is used to realize the connection between the fan lamp 100 and the installation base, thereby realizing the installation of the fan lamp 100. The suspension assembly 2 can realize the connection between the blade assembly 3 and the ceiling assembly 1, i.e., a length of the hanging rod 21 in the suspension assembly 2 can be set flexibly, and optionally, the hanging rod 21 can adopt a multi-stage structure, such that the user can adjust the length of the hanging rod 21 according to his or her own needs so as to change the installation height of the fan lamp 100. The blade assembly 3 can realize a blowing function, and the light source assembly 4 can perform lighting, thereby making the fan lamp 100 more functional.

When installing the fan lamp 100, the bracket body 12 in the ceiling assembly 1 can first be fixedly installed on the installation base by a fastener such as a screw, the terminal assembly 6 is electrically connected to mains power, and the hanging ball 22 in the suspension assembly 2 is snapped into the first installation hole 117 of the ceiling box 11, the hanging rod 21 of the suspension assembly 2 is sequentially connected to the blade assembly 3 and the light source assembly 4, a functional assembly is placed in the installation cavity 111 of the ceiling box 11, and after the ceiling box 11 is aligned with the bracket body 12, the hanging ball 22 of the suspension assembly 2 enters into the second installation hole 1231 of the bracket body 12 through the notch 1232 on the base plate 123, and is detachably connected to the bracket body 12. At this time, the ceiling box 11 is rotated counterclockwise, the first connecting part 116 of the ceiling box 11 and the second connecting part 124 of the bracket body 12 are rotationally snapped together under the guiding effect of the first guiding part 1161 and the second guiding part 1241, and the installation is completed after the first connecting part 116 of the ceiling box 11 contacts the limiting part 1242 on the bracket body 12. When it is necessary to disassemble the fan lamp 100, the ceiling box 11 is first lifted, and then rotated clockwise so that the first connecting part 116 of the ceiling box 11 is separated from the second connecting part 124 of the bracket body 12, and then the suspension assembly 2 is pulled out of the second installation hole 1231 from the notch 1232 of the base plate 123. The fan lamp 100 can be installed and disassembled by a single person, which is time-saving and labor-saving, and is efficient and safe.

In summary, the ceiling assembly 1 of the present disclosure has a simple structure, an aesthetically pleasing appearance, and is detachably connected by means of a rotary connection, the installation process is simplified, the installation cost is reduced, and the installation is convenient and fast, so that the fan lamp 100 having the ceiling assembly 1 can be installed and disassembled by a single person, which saves time and labor, and is efficient and safe. In addition, the present disclosure makes good use of the space of the ceiling box 11 and improves the aesthetics of appearance of the fan lamp 100 by disposing the connecting part of the ceiling assembly 1 in the installation cavity 111 of the ceiling box 11.

The present disclosure provides a ceiling assembly for fan lamp installation, the ceiling assembly has a simple structure, aesthetically pleasing appearance, and provides easy and quick installation.

The present disclosure provides a ceiling assembly, configured for an installation of a fan lamp, and comprising: a bracket body and a ceiling box, wherein the ceiling box has an installation cavity, and the bracket body is housed in the installation cavity, the ceiling box is provided with a first connecting part, the bracket body is provided with a second connecting part at a position corresponding to the first connecting part, the first connecting part is detachably connected with the second connecting part, and the first connecting part is provided with a first guiding part on a connecting surface thereof corresponding to the second connecting part.

As a further improvement of the present disclosure, the first guiding part is inclined, and a cross-sectional area, along a height direction, at either one position of the first guiding part is positively related to a spacing distance between the either one position of the first guiding part and a guiding end of the first connecting part.

As a further improvement of the present disclosure, a reinforcing rib is provided on a side of the first connecting part away from the connecting surface.

As a further improvement of the present disclosure, two first connecting parts are provided, and the two first connecting parts are provided in a mirroring-configuration.

As a further improvement of the present disclosure, the bracket body further comprises an installation part, the installation part is connected to an installation base, and there is a first height difference between the installation part and the second connecting part along a height direction.

As a further improvement of the present disclosure, the second connecting part comprises a second guiding part and a limiting part, the limiting part and the second guiding part are respectively located at two ends of the second connecting part, and an extension direction of the limiting part is opposite to an extension direction of the second guiding part.

As a further improvement of the present disclosure, the limiting part is fixedly connected with the installation part and the second connecting part.

As a further improvement of the present disclosure, the ceiling box is provided with a first installation hole, the bracket body is provided with a second installation hole, and a suspension assembly passes through the first installation hole and the second installation hole and is at least partially housed within the ceiling assembly.

As a further improvement of the present disclosure, the bracket body further comprises a base plate, the base plate is provided with a notch, the notch is connected to the second installation hole, and the suspension assembly is detachably connected to the bracket body through the notch.

The present disclosure provides a fan lamp having the aforementioned ceiling assembly, the fan lamp can be installed and disassembled by a single person, which saves time and labor, and is efficient and safe.

In order to realize the abovementioned purpose, the present disclosure provides a fan lamp, comprising: a suspension assembly, a blade assembly, a light source assembly, and the abovementioned ceiling assembly, the ceiling assembly is detachably connected to the suspension assembly, the suspension assembly is fixedly connected to the blade assembly and the light source assembly, and the light source assembly is disposed on a side of the blade assembly away from the ceiling assembly.

The beneficial effect of the present disclosure is that, compared with the prior art, the ceiling assembly of the present disclosure has a simple structure, aesthetically pleasing appearance, and is detachably connected by means of a rotary connection, through which the installation process is simplified, the installation cost is reduced, and the installation is convenient and fast, so that the fan lamp having the ceiling assembly can be installed and disassembled by a single person, thereby saving time and labor, and being efficient and safe. In addition, in the present disclosure, a space of the ceiling box is well utilized by disposing the connecting part of the ceiling assembly in the installation cavity of the ceiling box, which improves the aesthetics of the appearance of the fan lamp.

The above examples are only used to illustrate the technical solutions of the present disclosure, and are not intended to limit the present disclosure, although the present disclosure has been described in detail with reference to the examples, a person of ordinary skill in the art should understand that, modifications or equivalent substitutions can be made to the technical solutions of the present disclosure, without departing from the spirit and scope of the technical solutions of the present disclosure.

What is claimed is:

1. A ceiling assembly, configured for an installation of a fan lamp, and comprising:
   a bracket body and a ceiling box, wherein the ceiling box has an installation cavity, and the bracket body is housed in the installation cavity, the ceiling box is provided with a first connecting part, the bracket body is provided with a second connecting part at a position corresponding to the first connecting part, the first connecting part is detachably connected with the second connecting part, the first connecting part is provided with a first guiding part on a connecting surface thereof corresponding to the second connecting part, and a reinforcing rib is provided on a side of the first connecting part away from the connecting surface.

2. The ceiling assembly according to claim 1, wherein the first guiding part is inclined, and a cross-sectional area, along a height direction, at either one position of the first guiding part is positively related to a spacing distance between the either one position of the first guiding part and a guiding end of the first connecting part.

3. The ceiling assembly according to claim 1, wherein two first connecting parts are provided, and the two first connecting parts are provided in a mirroring-configuration.

4. The ceiling assembly according to claim 1, wherein the bracket body further comprises an installation part, the installation part is connected to an installation base, and there is a first height difference between the installation part and the second connecting part along a height direction.

5. The ceiling assembly according to claim 4, wherein the second connecting part comprises a second guiding part and a limiting part, the limiting part and the second guiding part are respectively located at two ends of the second connecting part, and an extension direction of the limiting part is opposite to an extension direction of the second guiding part.

6. The ceiling assembly according to claim 5, wherein the limiting part is fixedly connected with the installation part and the second connecting part.

7. The ceiling assembly according to claim 1, wherein the ceiling box is provided with a first installation hole, the bracket body is provided with a second installation hole, and a suspension assembly passes through the first installation hole and the second installation hole and is at least partially housed within the ceiling assembly.

8. The ceiling assembly according to claim 7, wherein the bracket body further comprises a base plate, the base plate is provided with a notch, the notch is connected to the second installation hole, and the suspension assembly is detachably connected to the bracket body through the notch.

9. A fan lamp, comprising: a suspension assembly, a blade assembly, a light source assembly, and a ceiling assembly, wherein:
   The ceiling assembly comprises: a bracket body and a ceiling box, wherein the ceiling box has an installation cavity, and the bracket body is housed in the installation cavity, the ceiling box is provided with a first connecting part, the bracket body is provided with a second connecting part at a position corresponding to the first connecting part, the first connecting part is detachably connected with the second connecting part, and the first connecting part is provided with a first guiding part on a connecting surface thereof corresponding to the second connecting part; and the ceiling assembly is detachably connected to the suspension assembly, the suspension assembly is fixedly connected to the blade assembly and the light source assembly, and the light source assembly is disposed on a side of the blade assembly away from the ceiling assembly.

* * * * *